UNITED STATES PATENT OFFICE.

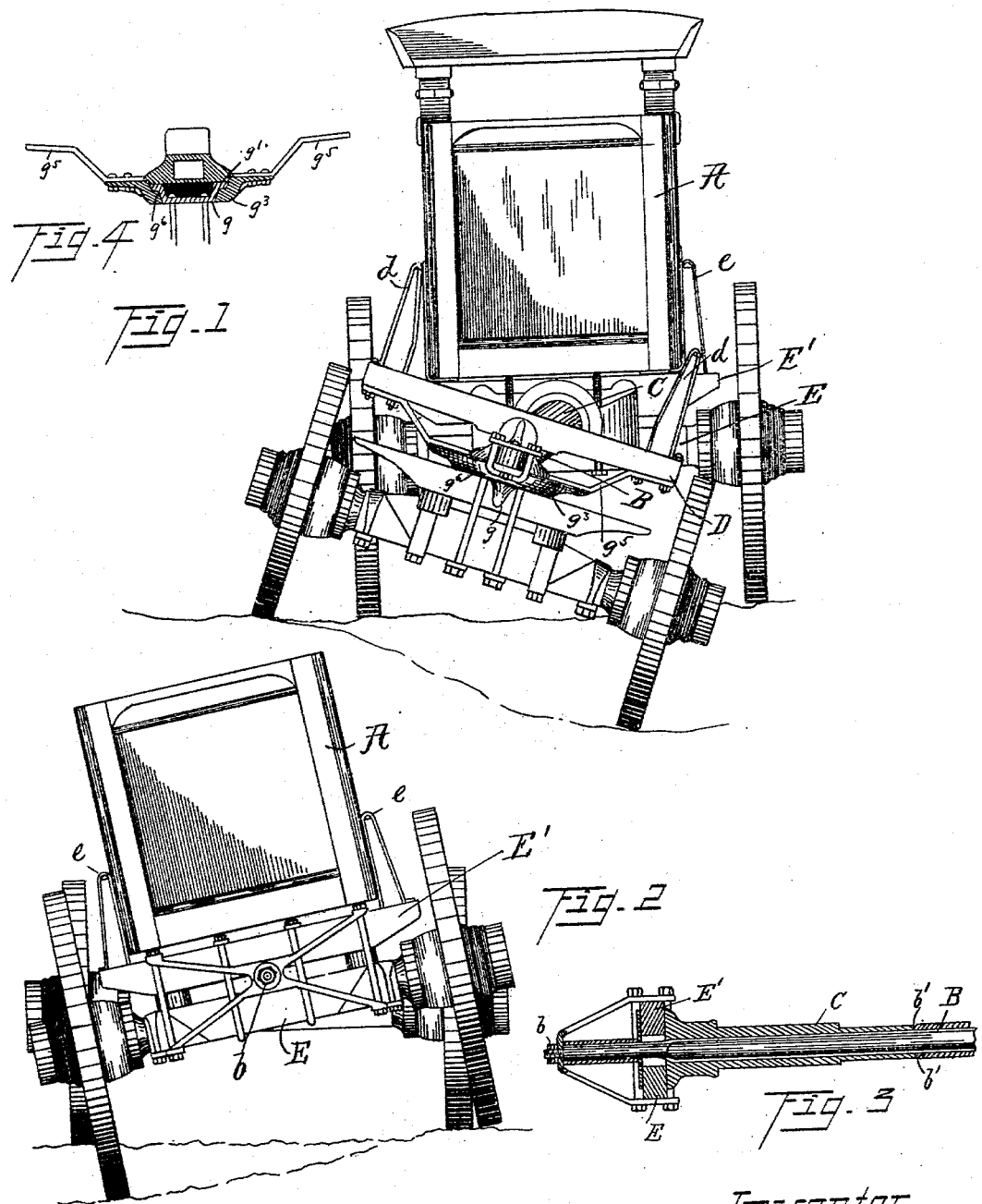

FRANK S. INGOLDSBY, OF DENVER, COLORADO.

RUNNING-GEAR FOR WAGONS.

SPECIFICATION forming part of Letters Patent No. 551,320, dated December 10, 1895.

Application filed April 1, 1895. Serial No. 544,068. (No model.)

*To all whom it may concern:*

Be it known that I, FRANK S. INGOLDSBY, a citizen of the United States, residing at Denver, in the county of Arapahoe and State of Colorado, have invented certain new and useful Improvements in Wagons; and I do hereby declare the following to be a full, clear, and exact description of the invention, such as will enable others skilled in the art to which it appertains to make and use the same.

The invention relates to certain improvements in wagons.

The object of the invention is to provide a construction with which, when one of the wheels falls into a rut or hole, or is depressed in any manner below the plane in which the other three wheels rest, said wheel is either wholly or partly relieved from the pressure from the load.

The invention consists in the construction and combination of parts hereinafter described and claimed.

In the drawings, Figure 1 is a front view of the wagon, showing one wheel in a depression. Fig. 2 is a rear view with one of the rear wheels in a depression. Fig. 3 is a longitudinal central section through the rear coupling, and Fig. 4 is a transverse sectional view through the fifth-wheel device.

Referring to the parts by letters, A represents the box. This box must be so constructed that it is substantially stiff and unyielding, whereby if it is supported at three corners the other corner will not be bent down by its own weight or by the weight of a load. The box may be of any construction suitable for securing this result; but I recommend a construction substantially like that which is shown in an application for a patent filed by me and bearing even date with this application.

B represents a reach which is rigidly connected with the front bolster D by any suitable means. The rear end of the reach is cylindrical and passes through a cylindrical sleeve C which is rigidly connected with the rear axle E and bolster E'. This reach passes beyond the rear axle and bolster and on its rear end is a nut *b* which prevents it from being drawn forward relative to said axle. On the reach also a shoulder or shoulders *b'* are formed, which abut against the front end of said sleeve. By means of this construction the rear axle, it will be seen, is pivoted upon the reach. Any other mechanism for connecting these parts, by means of which the rear axle and bolster can be pivoted upon the reach, is the equivalent of the construction above described. In fact, if the reach was rigidly connected with the rear axle and was of such construction that it could be twisted, the action of the wagon would be substantially the same as it is with the described construction up to the limit of the twisting movement of said reach. I prefer that the rear axle shall be pivoted to the reach and that the reach shall be rigidly connected with the front axle, as described; but this condition of affairs might be reversed without affecting in any marked degree the mode of operation of the wagon. The front axle is connected with the front bolster by a fifth-wheel contrivance so constructed as to permit the said axle to turn on a substantially vertical axis, but which prevents any other relative movement of said bolster and axle.

Any fifth-wheel contrivance which operates in the described manner may be employed, but I prefer to employ a fifth-wheel consisting of the following parts, viz: a disk $g$ having on its edge a horizontal circular flange $g'$, which is secured to the front axle, a circular rub-plate secured to the front bolster resting upon said flange $g'$, and a collar $g^3$ which embraces the flange $g'$ and disk $g$ and is secured by means of braces $g^5$ to the front bolster, said collar being also provided with a flange $g^6$, which lies beneath the flange $g'$. This fifth-wheel is described more particularly and in detail in an application filed by me bearing date with this application; but, as before stated, I may use any other fifth-wheel device which will permit the front axle to turn in the usual manner, but which will preserve the parallelism of the front axle and bolster.

The wagon-box rests upon the front bolster between the standards *d d*, and it rests upon the rear bolster between the standards *e e*. One end or the other of the box must fit so loosely between the adjacent standards that one side of said end and the corresponding end of the adjacent bolster may move apart, while the opposite side of the box continues to rest upon its bolster, substantially as shown in Fig. 1. Both ends of the box may be thus loosely set between the standards and be susceptible of the same movement relative to the bolster, if desired.

In the construction shown in the drawings the standards $e\ e$ fit close against the sides of the wagon-box, and thereby prevent the described relative movement of the box and rear bolster; but the principal reason for so connecting the rear bolster and box that they have no relative movement is to permit the employment of brake mechanism (part of which must be secured to the box) adapted to engage with the rear wheels. When the rear end of the box is thus held against the entire rear bolster, the action of the box when one of the rear wheels goes into a rut is somewhat different than it is when one of the front wheels goes into a rut; but the action in both cases is analogous.

In the best construction of the standards $d\ d$ their inner sides incline outwardly from bottom to top. The lower part of said standards lie more or less closely to the box when said box is resting squarely upon the bolster, whereby it has little or no side movement; but because of the outward inclination of said standards the described relative movement of the box and bolster is possible.

When a wagon constructed substantially as above described is being drawn along, and one of the front wheels, for example, enters a rut, the bolster on the corresponding side of the wagon drops away from the wagon-box, which does not dip sidewise but is thereafter supported at its opposite front side on the bolster, while its entire rear end rests upon the rear bolster. It is evident, therefore, that the weight of the box or the load in the box does not tend to hold said wheel down, but on the contrary, the weight of the front end of the box rests upon the opposite elevated side of the bolster and tends to assist in lifting said wheel out of the rut or hole into which it has fallen.

If the fifth-wheel contrivance did not have substantially the characteristics above described, the weight of the box would tend to hold the front bolster against the box while one end of the front axle would alone move downward, and this would tend to break the king-bolt, if one were used, and would defeat the action of the parts as above described. When one wheel does move down as described, the reach turns in the sleeve secured to the rear axle, and thereby said reach is not wrenched or twisted or broken.

If one of the rear wheels should go into a rut or hole, the wagon-box would tip, because it would remain resting squarely upon the bolster, and in so tipping the diagonally opposite front corner of the box would be lifted from the front bolster, the reach turning in its bearing in the rear bolster and axle, as before. It is evident, therefore, that no greater weight is shifted onto the depressed wheel than it carried before it was depressed, as is the effect in the old constructions of wagons, for all the weight of the load and the box which lies to one side of a diagonal line running from that rear corner of the box which is not depressed to the front corner of the box which is not elevated is acting to balance the weight of the box and the load on the opposite side of said diagonal line, which presses down on the depressed wheel, and this elevated part of the load is exerting a leverage at all times tending to lift the depressed wheel from the rut.

If the box were set loosely upon the rear rear axle, the relative movement of the rear bolster and box would be substantially like the action of the front bolster and box, as before explained.

If the wagon box were not stiff and rigid, the parts would not operate in the described manner, because the corner of the box which in the described operation of the parts is separated from the supporting bolster would bend down and probably break. A stiff box is therefore essential to the described operation.

Having described my invention, I claim—

1. In a wagon, the combination of the rear bolster and axle, the front bolster, a reach connecting said parts and having a cylindrical end upon which one of said parts is pivoted, the front axle, and a fifth wheel device which connects said front axle and front bolster and holds them in parallel planes, with a stiff wagon box, which rests upon the two bolsters, two standards secured to one of said parts between which said box fits loosely, substantially as and for the purpose specified.

2. In a wagon, the combination of the front bolster, the rear axle and bolster, a reach rigidly connected with the front bolster, and having a cylindrical end upon which the rear bolster and axle are pivoted, the front axle and a fifth wheel device which connects said front axle and bolster and holds them in parallel planes, with two outwardly inclined standards secured to the front bolster, and a wagon box which rests upon both bolsters and fits loosely between said standards, substantially as and for the purpose specified.

In testimony whereof I affix my signature in presence of two witnesses.

FRANK S. INGOLDSBY.

Witnesses:
 EDWIN L. THURSTON,
 F. GRISWOLD.